United States Patent [19]

Faeroe

[11] Patent Number: 4,981,108
[45] Date of Patent: Jan. 1, 1991

[54] ANIMAL FEEDING DISH

[76] Inventor: Daryan S. Faeroe, 4990 Old Lucern Park Rd., Winter Haven, Fla. 33881

[21] Appl. No.: 422,054

[22] Filed: Oct. 16, 1989

[51] Int. Cl.$^5$ .............................................. A01K 5/00
[52] U.S. Cl. ..................................................... 119/61
[58] Field of Search ................ 119/61; 220/90.2, 90.4, 220/85 K

[56] References Cited

U.S. PATENT DOCUMENTS

| D. 269,386 | 6/1983 | Khider | 119/61 X |
|---|---|---|---|
| 2,191,811 | 2/1940 | Trampler, Sr. | 119/61 X |
| 2,584,301 | 2/1952 | Sinclair | 119/61 |
| 2,782,614 | 2/1957 | Currie | 220/90.6 |
| 3,185,341 | 5/1965 | Barbour | 220/90.2 X |
| 3,731,658 | 5/1973 | Livermore et al. | 119/61 |
| 3,734,064 | 5/1973 | O'Hara | 119/61 |
| 4,784,086 | 11/1988 | Hand et al. | 119/61 |
| 4,803,954 | 2/1989 | Welch et al. | 119/61 |

FOREIGN PATENT DOCUMENTS 865259  4/1961  United Kingdom ............... 220/90.2

Primary Examiner—Robert P. Swiatek
Assistant Examiner—Todd E. Manahan
Attorney, Agent, or Firm—James H. Beusse

[57] ABSTRACT

An improved animal feeding dish prevents crawling insects such as ants from entering and contaminating pet food contained within the dish. The structure comprises a generally upright bowl-shaped container which includes an imperforate circular base and an imperforate wall extending upward from the base and circumscribing the base. The bowl-shaped container is designed to receive and contain a predetermined amount of pet food. A trough is formed integrally with and circumscribes the container for holding a liquid such as water for deterring crawling insects from the container. The dish may be provided with a protective removable flange which extends outwardly from an upper rim of the container. The flange covers the underlying trough to reduce evaporation of the contained liquid and to prevent food and an animal's ears from falling into the trough.

4 Claims, 1 Drawing Sheet

ANIMAL FEEDING DISH

The present invention relates to an animal feeding dish and, more particularly, to a feeding dish for dogs or similar small animals which prevents ants and/or other crawling insects from entering such device.

BACKGROUND OF THE INVENTION

Most pet feeding devices are simple bowls or dishes. Dog and cat dishes are generally placed on the ground or floor with sufficient food such that some amount is often left in the dish. This leftover food or even small scraps stuck to the dish are an attractant for ants and other small crawling insects. Where the animals may be left alone for some time, there is a great temptation to overfeed and thus have excess leftover food in the pet dish. Ants invading such food render it inedible and may contaminate the food with diseases.

U.S. Pat. No. 2,584,301 describes a moated dog feeder comprising two feeding devices attached to a supporting frame. Each feeding device includes a removable bowl having a circumscribing flange around its top edge. The bowl fits into an annular U-shaped moat element which is supported on the frame. The frame maintains the feeding devices above a floor or other surface on which the frame rests. A spring clip is welded to the frame for supporting and retaining the moat element.

The moated dog feeder of the above patent is complicated and incorporates so many different components that its manufacturing cost is prohibitive. Furthermore, each of the different parts require disassembly in order to facilitate cleaning.

It is, therefore, desirable to provide an improved animal feeding device which overcomes the disadvantages of the prior art. In particular, a need exists for a pet feeding device which deters ants or other small crawling insects from contaminating food in the device and which is simple to manufacture and clean.

SUMMARY OF THE INVENTION

Accordingly, it is an object of the present invention to provide an improved animal feeding device whereby pet food may be received and contained in a feeding container or tray, which feeding tray is circumscribed by a fixedly attached receptacle for receiving and containing a liquid, such as, for example, water, which serves as a barrier to prevent ants or other small insects from invading and possibly contaminating food in the feeding tray and which can be easily manufactured and cleaned.

An additional object of this invention is to provide a unitary moated animal feeding dish which includes a protective detachable lip or flange which extends radially downwardly from the rim of the feeding tray for shading the water barrier or receptacle to reduce evaporation, to prevent an animal's ears or debris from falling into the water receptacle, and to prevent the animal from drinking the water.

Another object of the present invention is to construct a unitary moated animal feeding dish with a moat of a depth sufficient to receive a predetermined amount of liquid, which liquid not only inhibits entrance by water-deterred insects, but also functions as a weight to prevent tipping of the device.

Still another object of this invention is to provide a feeding device which is constructed of a sturdy material, efficient in operation, and simple and inexpensive to manufacture.

The above and other objects, features, and advantages are obtained in a feeding dish for animals comprising a feed container, a removably attachable protective flange circumscribing the rim of the container and extending downward and radially outwardly covering an underlying unitary water receptacle. The water receptacle, in turn, circumscribes the outer surface of the lower portion of the feed dish. The aforementioned flange may include an aperture or apertures through which water may be poured in order to be received by the underlying receptacle.

BRIEF DESCRIPTION OF THE DRAWINGS

For a better understanding of the present invention, reference may be had to the following detailed description taken in conjunction with the accompanying drawings in which.

DETAILED DESCRIPTION OF THE PREFERRED EMBODIMENT

Figure 1:
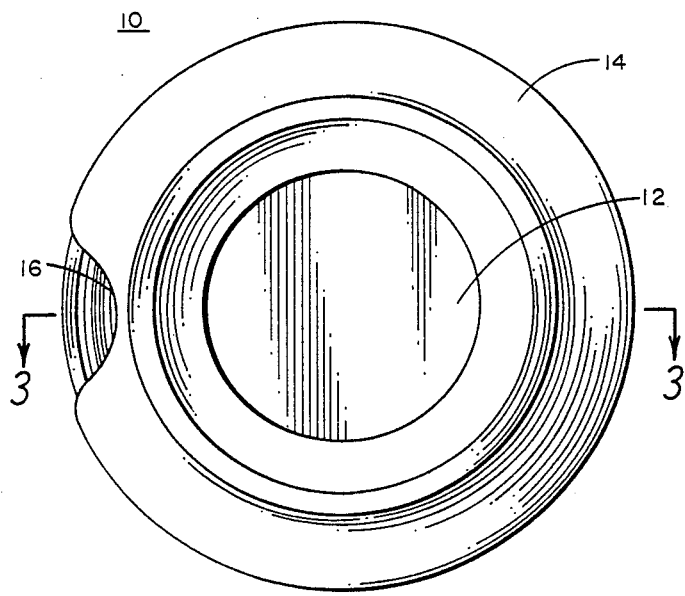
FIG. 1 is a top plan view of the present invention.
Figure 2:
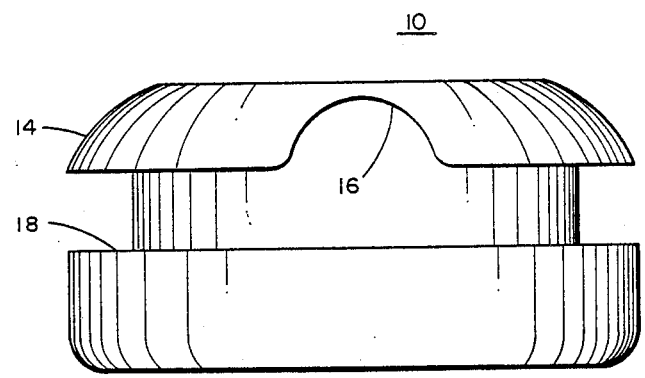
FIG. 2 is a side elevation view of the invention of FIG. 1 rotated 90°.
Figure 3:
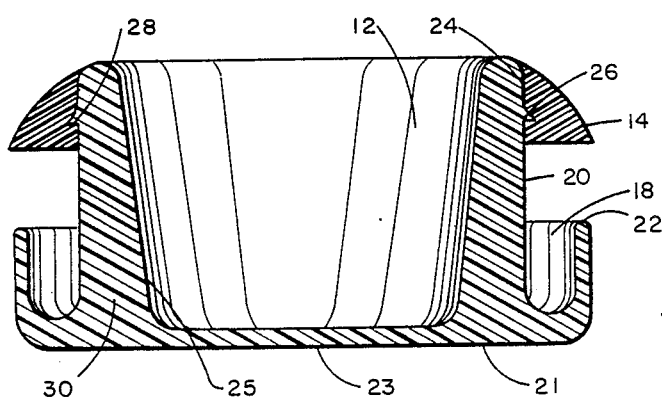
FIG. 3 is a cross-sectional view taken along the line 3—3 of FIG. 1.

FIGS. 1–3 illustrate a top plan view, a side elevation view and a vertical cross-sectional view, respectively, of an animal feeding device or pet dish 10 in one form of the present invention. Dish 10 comprises a central imperforate bowl or food container 12 surrounded by a removable outwardly extending flange or lip 14 attached adjacent an upper rim of the container. A small cutout 16 in the flange 14 provides vertical access to an underlying moat or trough 18 surrounding the base of the bowl 12. The trough 18 is formed by an outer surface 20 of bowl 12 and an integral upwardly directed flange 22 spaced from surface 20. The trough 18 is defined further by a base 21 extending outwardly from a base 23 of container or bowl 12, with the bowl 12 being defined by upwardly extending wall 25 from base 23. The flange 22 forms an outer, upwardly extending wall of trough 18. Flange 22 is generally lower or of less height than wall 25 of container 12. The container 12 and trough 18 form a unitary feeding dish which can be injection molded from thermoplastic materials.

The purpose of the trough 18 is to provide a reservoir surrounding the bowl 12 which may be filled with water. Applicant has found that such a trough deters ants and other crawling insects from entering the bowl 12. Ants, in particular, do not willingly enter any water in the trough 18 and those which inadvertently fall into the water will generally drown before crossing. Thus, the moat or trough 18 prevents such insects from spoiling food in the bowl 12.

The purpose of the flange 14 overhanging the trough 18 is to prevent food particles from falling into the water in trough 18 and further to prevent the ears of some dogs, or other pets, from dangling into the water and generally creating a sloppy or messy eating area. The flange also prevents drinking of the water by an animal so that a surfactant or other chemical may be added to the water. The flange 14 may contribute to a reduction in the evaporation rate of water in trough 18 in situations where excess food is to be supplied to last for an extended period such as when the pet owner is absent for some time. Flange 14 circumscribes the container 12 and extends outwardly of the upper rim of wall 25, spaced from and overhanging trough 18.

The base 21 of trough 18 may be a continuation of base 23 of container 12 as shown in FIG. 3. Alternately, as will be seen in FIG. 4, the base 21 may be spaced from the base 23. In this latter form, it may be desirable to raise the base 23 to a plane above that of base 21 in order to improve stability of the dish 10 by transferring weight to the outer circumference of the dish.

For ease of manufacture and to simplify cleaning of the feeding dish 10, it is desirable to form the flange 14 as a separate and removably attachable element of the assembled dish. In one form, the flange 14 may be an annular element having an inner diameter substantially conforming to the diameter of the outer surface 20 of bowl 12 along the line 24 and may include an inner annular groove 26 which engages with an outer raised ridge 28 on surface 20 to hold the flange 14 in place. Alternatively, the flange 14 may be formed with a ridge and a groove formed in bowl 12 as shown in FIG. 4.

In the form illustrated in FIG. 3, the dish 10 is molded in a solid form, i.e., the walls 30 and other parts of the dish are a solid thermoplastic or thermosetting material. While the solid form of dish provides the advantage of being more stable due to its heavier weight, such weight may be unnecessary in larger sized dishes and may increase manufacturing cost. FIG. 4 illustrates another embodiment in which the dish 10 is formed with hollow wall. The wall 30 in FIG. 4 comprises an inner wall 34 and an outer wall 36. The flange 14 is a separate molded part which may snap-fit onto the upper edge of outer wall 36. The wall 36 may be formed with an outer annular groove 38 which mates with inner annular ridge 40 on flange 14 and enables the flange 14 to be removably attached to the feeding dish by pressing the flange onto wall 36 until the ridge 40 snaps into the groove 38.

Figure 4:
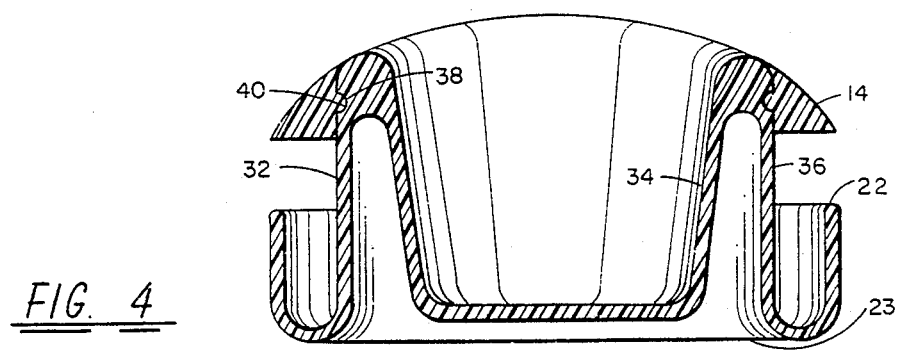
FIG. 4 is a cross-sectional view similar to FIG. 2 of an alternate form of the invention.

While the weight of the dish 10 is reduced by the hollow construction of FIG. 4, it is expected that this form would be used in larger diameter dishes and that water in the trough 18 would add sufficient weight to effectively stabilize the dish to avoid tipping. Additional stability is provided by forming the feeding dish such that the bottom 23 of the inner container 12 lies in a plane above the plane of bottom surface 21 of the circumscribing moat. This assures that the weight of the dish, and any food and water in the dish, is transferred to the outer circumference of the dish. As with the embodiment shown in FIG. 3, the embodiment of FIG. 4 combines the feed container 12 and the surrounding moat or trough 18 into a unitary structure susceptible to injection molding from a thermoplastic material.

While the invention has been illustrated in what is considered to be preferred forms, other variations will be apparent. The dish 10 may, for example, be square, rectangular, or any other shape rather than round as shown. The flange 14 may take other configurations or may be constructed of a material different from that of the bowl 12. It is intended, therefore, that the invention not be limited to the illustrative embodiment, but be interpreted in accordance with the spirit and scope of the appended claims.

What is claimed is:

1. A unitary pet feeding dish incorporating a circumscribing trough for preventing crawling insects from contaminating food placed within the dish comprising:
    a generally upright bowl-shaped, imperforate container having a base and a wall extending upward from the base for containing a predetermined amount of pet food therein; and
    a water impervious trough formed integrally with said container and circumscribing said container, said trough having a bottom comprising an outward extension of said wall of said container and having an outer wall extending upward from an outer portion of said bottom a distance less than the height of said wall of said container, said trough being defined by said outward extension, said outer wall and said wall of said container for maintaining a reservoir of water surrounding said container; and
    a flange extending outwardly of said wall of said container adjacent an upper rim thereof, said flange substantially circumscribing said container and spaced from and overlying said trough, said flange being releasably attachable to said wall of said container.

2. The pet feeding dish of claim 1 wherein one of said flange and said wall of said container is formed with an annular groove and the other of said flange and said wall of said container is formed with a mating annular ridge, said groove and said ridge being formed to provide a snap-fit releasable connection when said flange is pressed onto said container wall.

3. The pet feeding dish of claim 1 wherein said flange includes at least one partial cutaway providing vertical access to said trough for pouring water therein.

4. An animal feeding dish having an integral circumscribing trough for preventing crawling insects from entering the dish comprising:
    a generally upright bowl-shaped container having an imperforate base and an imperforate wall extending upward from the base for receiving and containing a predetermined amount of pet food therein;
    a trough circumscribing said container and having an imperforate base and an outer imperforate wall spaced from said wall of said container, said trough base extending from at least a part of said wall of said container to a lower rim of said trough wall so that said trough is defined by at least a part of an outer surface of said container wall, said trough base and said outer trough wall, said trough and said container forming a unitary feeding dish; and
    a removable flange circumscribing said container and extending outwardly from an upper edge of said wall of said container, said flange being vertically spaced from and overlying said trough, the flange including at least one aperture formed therethrough for establishing a vertically oriented opening over said trough for permitting pouring of liquid in said trough and said flange being removably attached to the upper edge of said container.

* * * * *